(12) United States Patent  
Hiraoka et al.

(10) Patent No.: US 6,195,236 B1
(45) Date of Patent: Feb. 27, 2001

(54) MAGNETIC HEAD ASSEMBLY, HAVING A SPRING ARM CONFIGURED FOR REMOVABLE ATTACHMENT TO A CARRIAGE ARM

(75) Inventors: Shinji Hiraoka; Hisato Arai; Yasuhiro Hamada; Tsuyoshi Furukawa, all of Nagano (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/920,106

(22) Filed: Aug. 26, 1997

(30) Foreign Application Priority Data

Dec. 26, 1996 (JP) .................................................... 8-346393

(51) Int. Cl.[7] .............................. G11B 5/50; G11B 21/26
(52) U.S. Cl. ...................................... 360/244.5; 360/245.2
(58) Field of Search .................................... 360/104, 105, 360/106, 244.5, 244.6, 245.2; 29/603.04, 603.03, 603.02

(56) References Cited

U.S. PATENT DOCUMENTS

| | | | |
|---|---|---|---|
| 4,027,865 | * 6/1977 | Greenwood et al. | 267/148 |
| 5,172,286 | * 12/1992 | Jurgenson | 360/104 |
| 5,185,683 | * 2/1993 | Oberg et al. | 360/104 |
| 5,602,698 | * 2/1997 | Miyazaki et al. | 360/104 |
| 5,689,389 | * 11/1997 | Braunheim | 360/104 |
| 5,706,574 | * 1/1998 | Shimanuki | 29/603.03 |
| 5,715,117 | * 2/1998 | Brooks | 360/104 |
| 5,796,555 | * 8/1998 | Aoyagi et al. | 360/104 |

* cited by examiner

Primary Examiner—William R. Korzuch
(74) Attorney, Agent, or Firm—Greer Burns & Crain, Ltd.

(57) ABSTRACT

A magnetic head assembly including a carriage arm and a spring arm having at least one magnetic head attached thereto. The spring aim is provided with a cylindrical member including a thin plate member having a trapezoidal cross-section provided at one end thereof. The structure of the spring arm enables the spring arm to be removably attached to a carriage arm of the magnetic head assembly.

7 Claims, 14 Drawing Sheets

FIG. 10A
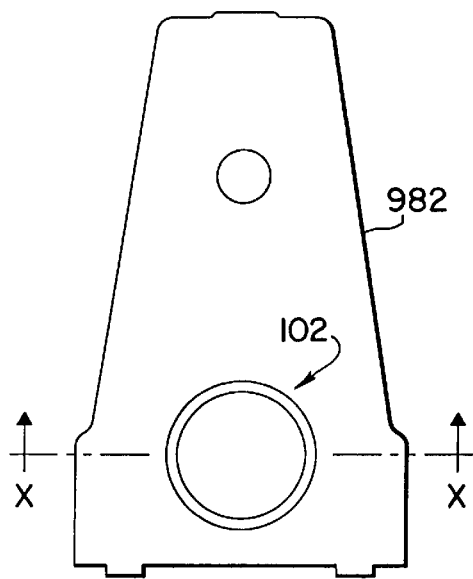
FIG. 11A
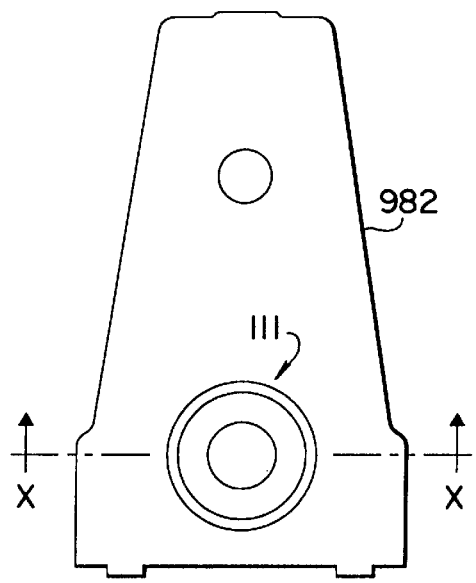
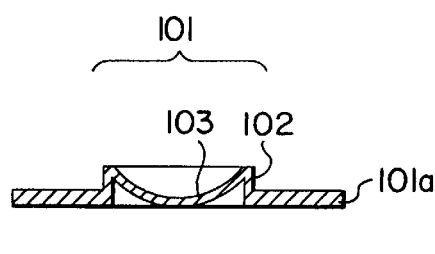
FIG. 10B
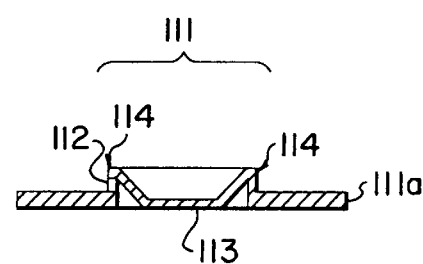
FIG. 11B

FIG. 12A
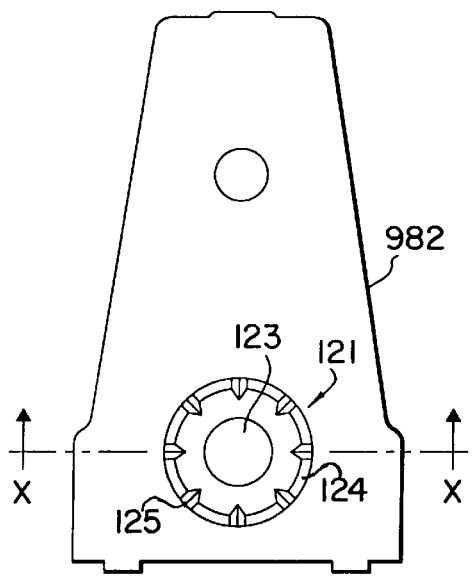
FIG. 13A
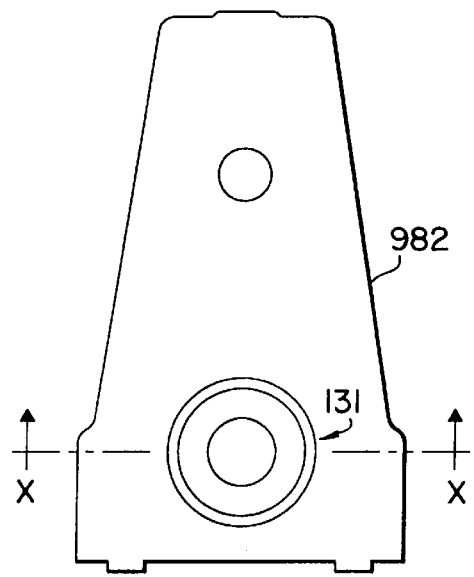
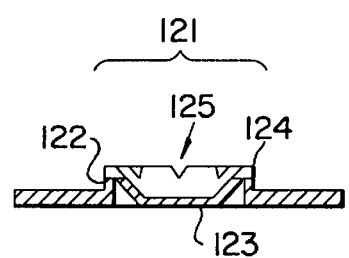
FIG. 12B
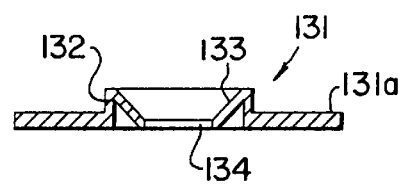
FIG. 13B

FIG. 14A
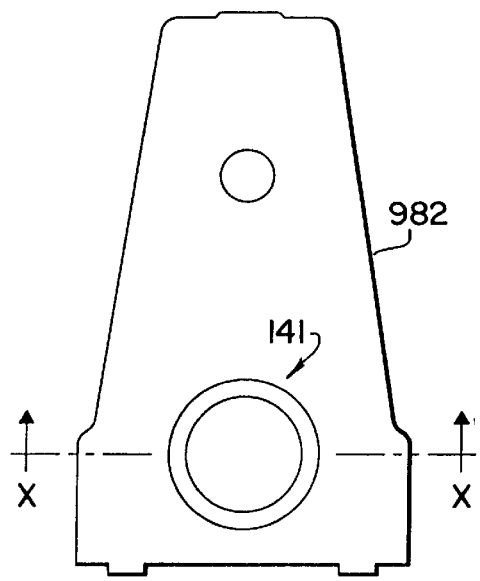
FIG. 15A
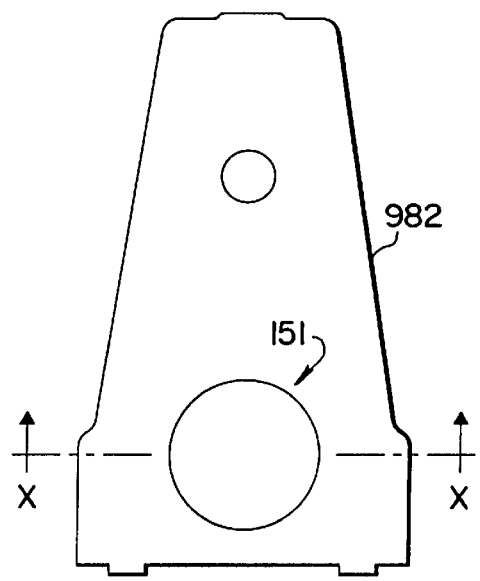
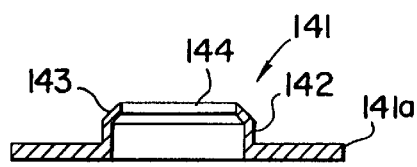
FIG. 14B
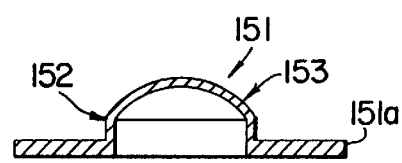
FIG. 15B

FIG. 18A
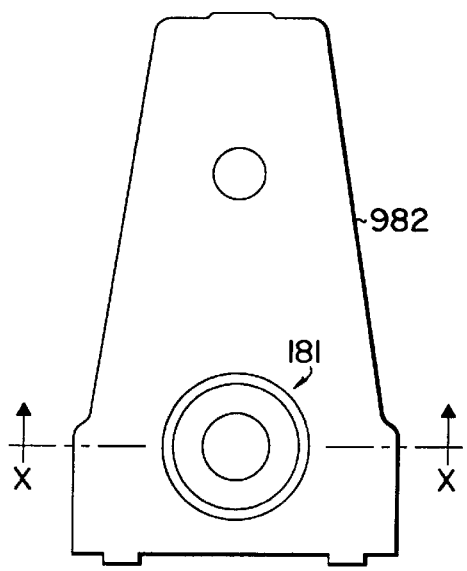
FIG. 19A
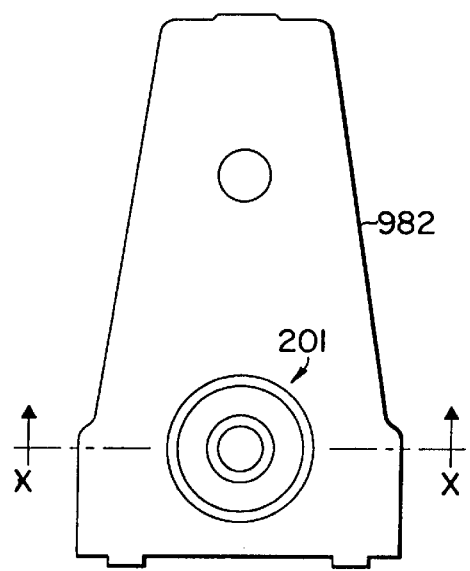
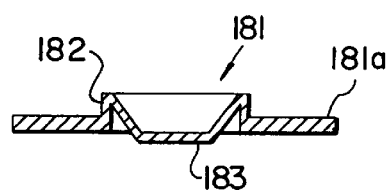
FIG. 18B
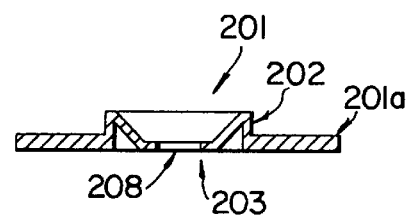
FIG. 19B

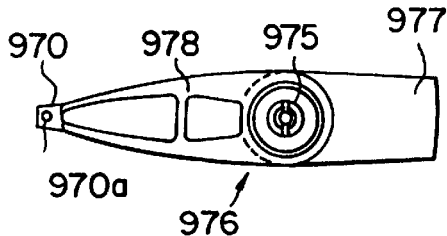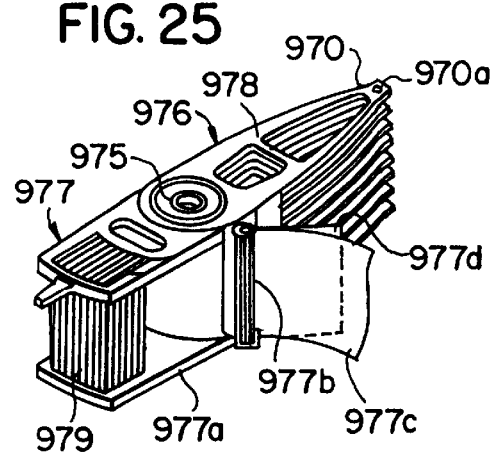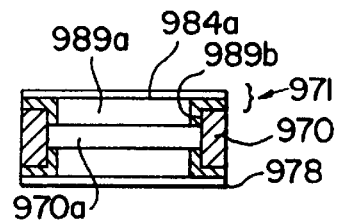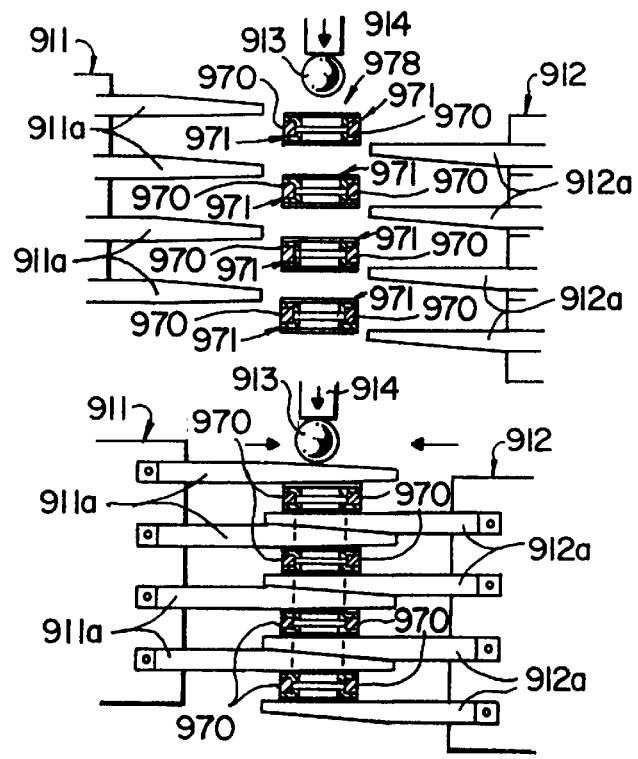

MAGNETIC HEAD ASSEMBLY, HAVING A SPRING ARM CONFIGURED FOR REMOVABLE ATTACHMENT TO A CARRIAGE ARM

BACKGROUND OF THE PRESENT INVENTION

The present invention relates to a magnetic disk drive having a magnetic head assembly mounted to a carriage arm, and more particularly to an improved method of mounting the magnetic head assembly which enables high recording density and assures high reliability.

Many magnetic disk drives accommodate a number of magnetic disks, and are provided with plural magnetic heads for reading and writing data. In known drives, one magnetic head corresponds to each surface of each magnetic disk. Each magnetic head is mounted at an end portion of a spring arm which, in turn, is attached to an end portion of a carriage arm. The carriage arm is a part of an actuator assembly. When an actuator of the actuator assembly is activated, the carriage arm moves, together with the magnetic head, along a radial direction of the magnetic disk medium.

A conventional method of fixing a magnetic head assembly to a carriage arm will now be explained with reference to FIGS. 26A–26C. In particular, FIG. 26A illustrates a cross-sectional view of the mounting portion when the magnetic head assembly is mounted to the carriage arm. A mounting hole 970a formed at the mounting portion 970 of each arm of the carriage arm 978 is provided to receive a cylindrical projected portion 989b of the magnetic head assembly 971 from both sides. Next, as shown in FIG. 26B, the carriage arm 978 is arranged between the dampers 911, 912. Each damper 911, 912 is respectively provided with a plurality of pressing plates 911a, 912a which are arranged like the teeth of a comb. Specifically, the upper surface of the pressing plate 911a and the lower surface of the pressing plate 912a are respectively tapered such that the dampers 911 and 912 mesh with one another. In this manner, each arm of the carriage arm 978 is held between the lower surface of the pressing plates 911a and the upper surface of the pressing plates 912a.

Further, as shown in FIG. 26C, the mounting portion 970 of the carriage arm 978 is held between the pressing plate 911a and pressing plate 912a. Under this condition, a caulking ball 913 is forcibly inserted using a caulking pin 914 into a caulking hole 989a formed in the head spacer 989. The caulking hole 989a is aligned with a hole 984a formed in the upper most arm of the magnetic head assembly 971. Together, these holes define a though hole (best seen in FIG. 23B). In particular, the caulking ball 913 is pressed into the caulking hole 989a via the hole 984a. Further, when the caulking ball 913 is provided into the caulking hole 989a, the cylindrical projected portion 989b expands its external diameter and is pressed against the internal surface of the mounting hole 970a of the carriage arm. In this manner, the magnetic head assembly 971 is fixed to the end portion of the carriage arm 978 to form the magnetic head arm.

However, once the magnetic head assembly is fixed to the carriage arm, it is difficult to remove the magnetic head assembly from the carriage arm to replace the magnetic head. Further, replacement of the magnetic head independent of the spring arm is virtually impossible due of the likelihood of damaging the spring arm. Accordingly, the use of a conventional caulk ball to fix the magnetic head assembly to the carriage arm results in a lowering of the fabrication yield, and decreased ease of maintenance.

In addition, the force generated by the caulk ball as it passes through the mounting hole is disadvantageous in that it tends to deform the head spacer. Moreover, as the caulk ball passes through the mounting hole, friction between the ball and head spacer generates dust which may subsequently cause a head crash.

Alternatively, instead of using a caulk ball, the magnetic head assembly may be attached to the carriage arm using screws. The use of screws makes it feasible to replace the magnetic head independent of the arm. However, the use of screws requires increased spacing between the head arms of the carriage arm to provide access for installation and removal. The recent trend towards smaller disk drives having increasingly higher recording density makes it increasingly desirable to reduce the size of the magnetic head assembly including reducing the interval between the head arms of the carriage arm. In addition, the relatively high mass of screws makes it difficult to maintain the low mass characteristics required to realize a high speed actuator. Thus, the use of screws is increasingly impractical.

Accordingly, in response to the problems discussed above, one object of the present invention is to provide a magnetic head assembly which can easily and accurately be fixed to an actuator assembly of the magnetic head assembly and which can be reduced in size.

Another object of the present invention is to provide a magnetic disk drive incorporating a magnetic head assembly which can easily and accurately be fixed to an actuator assembly of the magnetic head assembly, and to provide a method of fabricating the same.

Another object of the present invention is to provide a magnetic disk drive comprising a magnetic head arm which can precisely and easily fix a magnetic head assembly and an actuator assembly and can be reduced in size.

Another object of the present invention to provide a method of fabricating the same magnetic disk drive.

Yet another object of the present invention is to provide a magnetic head assembly including a spring arm having a magnetic head, a cylindrical portion provided on the spring arm and a thin plate member having a trapezoidal cross-section and being provided at the end portion of the cylindrical portion.

SUMMARY OF THE PRESENT INVENTION

The above objects are met or exceeded by the magnetic head assembly according to one aspect of the present invention which includes a spring arm having a cylindrical portion, a magnetic head, and a thin plate spring having a trapezoidal shape cross-section provided at an end portion of the cylindrical portion.

The above objects are also met by a magnetic disk drive according to another aspect of the present invention includes a carriage arm defining a mounting hole, a cylindrical member provided on a first end of a spring arm, and having a diameter which exceeds the diameter of the mounting hole, the cylindrical member being removably engaged to an inner surface of the carriage arm within the mounting hole, a thin plate member having a trapezoidal shaped cross-section provided at one end of the cylindrical member, and a magnetic head assembly provided on a second end of the spring arm. The cylindrical member has a trapezoidal shaped cross-section which is inverse in shape to the shape of the thin plate member.

BRIEF DESCRIPTION OF THE DRAWINGS

The above and other features of the present invention and the manner of obtaining them will become more apparent, and the invention itself will be best understood by reference to the following description in conjunction with the accompanying drawings, in which:

FIG. 10A is a plan view showing a shape of the head spacer;

FIG. 10B is a cross-sectional view along the line X—X in FIG. 10A;

FIG. 11A is a plan view showing a shape of the head spacer;

FIG. 11B is a cross-sectional view along the line X—X in FIG. 11A;

FIG. 12A is a plan view showing a shape of the head spacer;

FIG. 12B is a cross-sectional view along the line X—X in FIG. 12A;

FIG. 13A is a plan view showing a shape of the head spacer;

FIG. 13B is a cross-sectional view along the line X—X in FIG. 13A;

FIG. 14A is a plan view showing a shape of the head spacer;

FIG. 14B is a cross-sectional view along the line X—X in FIG. 14A;

FIG. 15A is a plan view showing a shape of the head spacer;

FIG. 15B is a cross-sectional view along the line X—X in FIG. 15A;

FIG. 18A is plan view showing a shape of the head spacer;

FIG. 18B is a cross-sectional view along the line X—X in FIG. 18A;

FIG. 19A is a plan view showing a shape of the head spacer;

FIG. 19B is a cross-sectional view along the line X—X in FIG. 19A;

FIG. 24 is a plan view of an actuator assembly;

FIG. 25 is a perspective view of an actuator assembly;

FIG. 26A shows a cross-sectional view of the mounting part of a conventional magnetic head assembly;

FIG. 26B shows a conventional mounting part before mounting;

FIG. 26C shows a conventional mounting method;

DETAILED DESCRIPTION

The above objects are addressed by the magnetic head assembly of the present invention, which includes a spring arm having a magnetic head, a cylindrical member attached to the spring arm, and a thin plate spring having a trapezoidal shaped cross-section provided at an end portion of the cylindrical member.

Figure 1A:
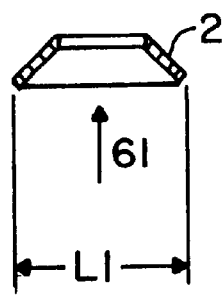
FIG. 1A is a side view of a first stabilized shape of a conventional counter sunk spring.
Figure 1B:
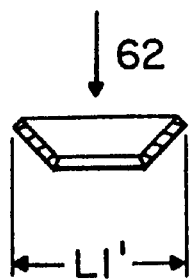
FIG. 1B is a side view of a second stabilized shape of a conventional counter sunk spring.

FIGS. 1A, 1B illustrate a conventional counter sunk spring 2 formed as a hollow conical body having a trapezoidal shaped cross-section. The conventional counter sunk spring 2 is formed as a hollow conical body having upper and lower open sides. When a force is applied in a direction shown by arrow 61, the counter sunk spring is shaped as shown in FIG. 1A. In particular, the shape of the counter sunk spring is trapezoidal, with the upper side shorter than the lower side L1. Meanwhile, when a force is applied in a direction shown by arrow 62, the counter sunk spring is shaped as shown in FIG. 1B. Here, the shape of the counter sunk spring is also trapezoidal, with the lower side shorter than the upper side L1'. A conventional counter sunk spring has one of the stabilized shapes as shown in FIG. 1A and FIG. 1B. In the stabilized conditions shown in FIG. 1A and FIG. 1B, L1=L1'.

Figure 1C:
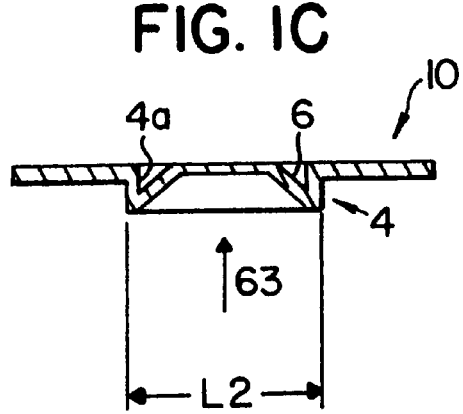
FIG. 1C is a side view of a first stabilized shape of a modified counter sunk spring made according to an embodiment of the present invention.

FIG. 1C shows a modified counter sunk spring 10 according to one aspect of the present invention having a hollow cylindrical body 4 coupled to the lower side L1 of the conventional counter sunk spring 2 (FIG. 1A). In particular, the modified counter sunk spring 10 includes a hollow cylindrical body 4, and a hollow conic body 6 having a trapezoidal cross-section and which is provided at an end portion of the cylindrical member 4. Specifically, the hollow conic body 6 is mounted to an internal wall surface of the hollow cylindrical body 4 and is restricted by the internal wall surface 4a. The modified counter sunk spring 10 has a first stabilized shape as shown in FIG. 1C. In the first stabilized shape, the coupling portion of the modified counter sunk spring 10, between the cylindrical member 4 and conic body 6, has a length L2.

Figure 1D:
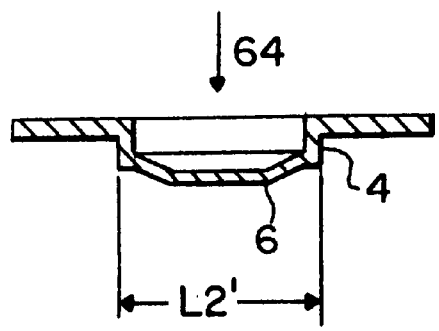
FIG. 1D is a side view of a second stabilized shape of a modified counter sunk spring.

As shown in FIG. 1D, the hollow conic body 6 may be deformed to a second stabilized shape by applying a force in a direction shown by arrow 64. As shown, the cylindrical member 4 is expanded at the coupling portion between the conic body 6 and the hollow cylindrical member 4 to a length of L2' in its end portion. In particular, the length L2' (FIG. 1D) is longer than the length L2 (FIG. 1C). As explained above, when a force is applied in the direction of arrow 64, the modified counter sunk spring 10 has the second stabilized shape which is unbalanced in relation to the first stabilized shape. Accordingly, this modified counter sunk spring 10 has the characteristic of L2<L2'.

The conic body 6 may have a general shape of a pyramid or a cone; however, a dome type shape is preferable. When a cone type or dome type conic body is used, the cylindrical member 4 is preferably a hollow cylindrical body. When the cylindrical member 4 is formed as a cylindrical body, the diameter of the cylindrical member 4 of the modified counter sunk spring 10 is extended. Moreover, the cylindrical member 4 is fixed to the carriage arm by the force of the extended diameter pressing against the internal wall surface of the mounting hole of the carriage arm.

Figure 22:
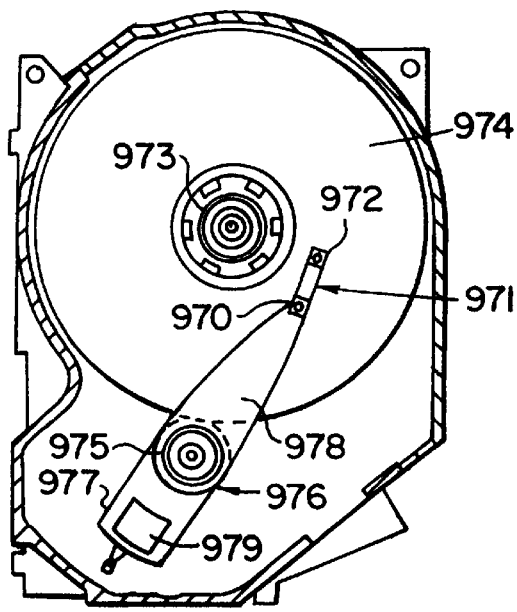
FIG. 22 is a structural diagram of a magnetic disk drive.

By manner of illustration, a magnetic disk drive according to the present invention will now be described with reference to FIG. 22. In particular, a predetermined number of magnetic disks 974 are mounted in parallel on a spindle mechanism 973, with a predetermined interval being maintained between adjacent disks (only one magnetic disk 974 is shown). An actuator assembly 976 which is structured to freely rotate around a rotating shaft 975 is provided in the vicinity of the magnetic disk 974. The actuator assembly 976 is provided with an actuator arm 977 and a carriage arm 978, each having rotating shaft 975 as their rotating locus. The actuator arm 977 is provided with a voice coil 979 which serves as a driver for driving the actuator assembly 976.

The actuator assembly 976 is provided with a number of carriage arms 978 corresponding to the number of magnetic disks 974. Each carriage arm 978 is provided at a mounting portion 970 with at least one magnetic head assembly 971. The magnetic head assembly 971 is provided at an end portion with a magnetic head 972 which is positioned to a predetermined track in the radial direction of the magnetic disk 974 by means of a carriage arm 978. The structure of the magnetic head assembly 971 in combination with the actuator assembly 976 is referred to generally as the magnetic head arm.

Figure 23A:
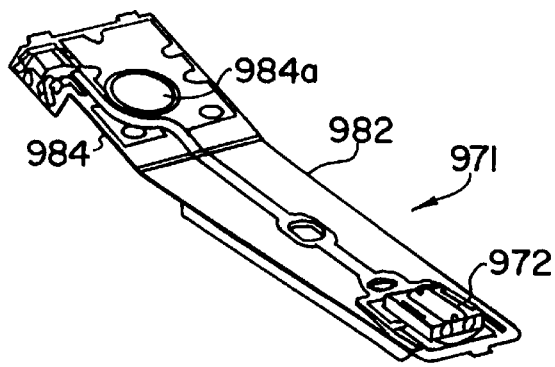
FIG. 23A is a perspective view of the magnetic head assembly in the magnetic disk drive.

FIG. 23A is a diagram illustrating the structure of the magnetic head assembly 971. The magnetic head assembly 971 includes a spring arm 982 formed by bending a metal plate, formed of stainless steel or the like, in a predetermined angle. The magnetic head 972 is fixed to a front end portion of the spring arm 982 using a bonding agent. The spring arm is further provided at a rear end portion with a mounting portion 984. A mounting hole 984a is formed at the mounting portion 984. The spring arm 982 is provided with a pin hole HL (FIG. 23B) through which a positioning pin (not illustrated) is inserted at the time of assembling the magnetic head assembly 971 to the actuator assembly 976.

Figure 23B:
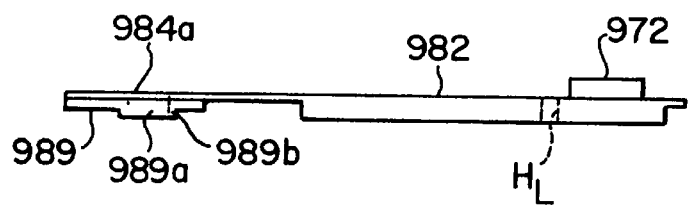
FIG. 23B is a side elevation view of the magnetic head assembly in the magnetic disk drive.

FIG. 23B is a side elevation view of the magnetic head assembly 971. The magnetic head 972 is mounted at one end of the spring arm 982. A head spacer 989 is fixed at the mounting portion 984 of the spring arm 982 by, for example, spot welding, etc. The head spacer 989 is provided with a cylindrical projected portion 989b having a through hole 989a located concentrically with the mounting hole 984a.

Turning now to FIGS. 24 and 25, FIG. 24 is a plan view of the actuator assembly 976, and FIG. 25 is a perspective view of the actuator assembly 976. The actuator assembly 976 is provided with a shaft 975, a carriage arm 978 composed of a plurality of arms and an actuator 977. When the actuator arm 977 is driven, the carriage arm 978 and actuator arm 977 rotate around the shaft 975.

Each arm of the carriage arm 978 has a mounting portion 970 provided with a mounting hole 970a for mounting the magnetic head assembly 971 to the arm. By manner of illustration, in FIG. 25, the uppermost carriage arm 978 has one magnetic head assembly 971 provided at a lower surface thereof. Correspondingly, the lowermost carriage arm 978 is provided with one magnetic head assembly 971 at an upper surface thereof. The intermediate carriage arms, e.g., arms other than the uppermost and lowermost, are provided with a magnetic head assembly 971 at both an upper and a lower surface thereof. The actuator 977 has a voice coil 979 provided on a coil supporting plate 977a and a flexible printed circuit board (FPC) 977c supported by a fixing portion 977b. FPC 977c is fixed to the actuator assembly 976 by means of a pressing plate 977d.

Figure 2A:
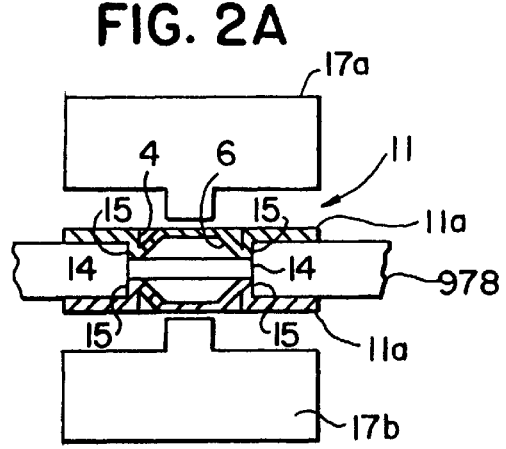
FIG. 2A is a side view of the condition of a head spacer before it is fixed to a carriage arm.
Figure 2B:
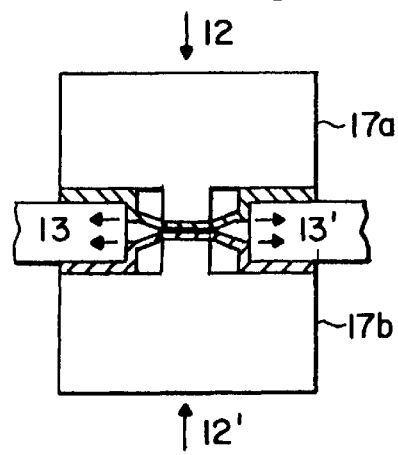
FIG. 2B is a diagram showing a method for fixing the head spacer of FIG. 2A using a pressing jig.
Figure 2C:
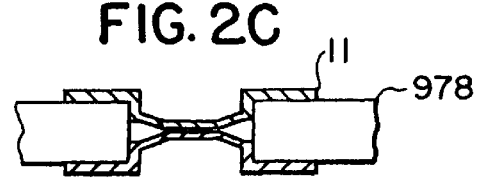
FIG. 2C is a diagram showing the condition of the head spacer of FIG. 2A after it is fixed to a carriage arm.

A first embodiment of the present invention will now be described with reference to FIGS. 2A–2C. A head spacer 11 (FIG. 2A) is mounted to an end portion of a spring arm 982 (FIG. 7) opposite the magnetic head 972 by, for example, spot welding. The head spacer 11 is provided with a modified counter sunk spring including a cylindrical internal wall surface 14 and a conic body 6 formed by bending a thin plate member toward a spacer plate 11a from an end part of the cylindrical member 4. As shown in FIG. 2A, the head spacer 11 may be arranged at both surfaces of the carriage arm 978. Next, as shown in FIG. 2B, a pressing force is applied to the conic body 6 by moving a pair of pressing jigs 17a, 17b in a direction shown by arrows 12, 12'. The pressing force causes the conic body 6 of the head spacer 11 to move from a first stabilized shape to a second stabilized shape, whereby the cylindrical member 4 of the head spacer 11 is deformed to expand along the directions 13, 13' orthogonal to the direction in which a pressing force is applied.

Referring now to FIG. 1C, the diameter of the cylindrical member 4 in the first stabilized shape is L2. However, as the head spacer is pressed into the second stabilized shape (FIG. 1D), the diameter of the cylindrical member 4 expands to a diameter L2', larger than the diameter L2 (FIG. 1C) of the cylindrical member 4 in the first stabilized shape. Accordingly, the diameter of the hollow mounting hole 970a (FIG. 7) of the carriage arm 978 is set a little larger than the diameter L2 (first stabilized diameter) but smaller than the diameter L2' (second stabilized diameter). Therefore, in the second stabilized shape the external circumference surface 15 (FIG. 2A) of the cylindrical member 6 presses against the internal wall 14 of the mounting hole 970a of the carriage arm 978, fixing the head spacer 11 to the carriage arm 978. Moreover, as shown in FIG. 1C, the cylindrical member 6 is fixed in such a manner that it is engaged with the mounting hole 970a of the carriage arm 978.

Figure 3A:
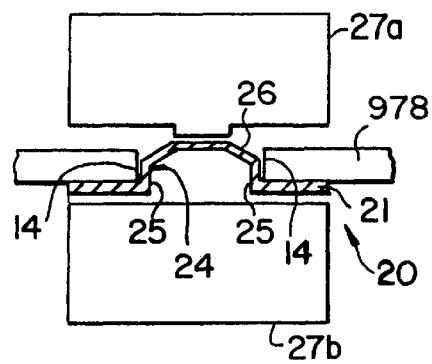
FIG. 3A is a side view showing the condition of another head spacer before it is fixed to a carriage arm.

A second embodiment of the present invention will now be explained with reference to FIGS. 3A–3C. As shown in FIG. 3A, head spacer 20 is provided with a spacer plate 21 including a hollow cylindrical member 24 and a thin plate member 26 provided at an end part of the cylindrical member 24. Cylindrical member 24 and the thin plate member 26 are integrally formed as a single piece with the spacer plate 21 by a squeezing process. The thin plate member 26 has a trapezoidal shaped cross-section and is projected from an end part of the cylindrical member 24 in a direction away from the surface of the spacer plate 21. Moreover, the cylindrical member 24 may also be formed as a circular cylinder or rectangular cylinder.

Figure 3B:
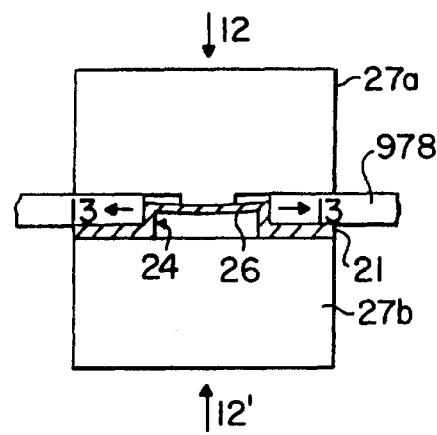
FIG. 3B is a diagram showing a method for fixing the head spacer of FIG. 3A using a pressing jig.
Figure 3C:
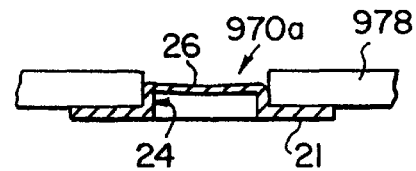
FIG. 3C is a diagram showing the condition of the head spacer of FIG. 3A after it is fixed to a carriage arm.

As shown in FIG. 3B, the spacer plate 21 is held between the carriage arm 978 and a pair of pressing jigs 27a, 27b. A pressing force is applied to the head spacer by moving the pressing jigs 27a, 27b in a direction shown by arrows 12, 12'. The pressing force 12 causes the thin plate member 26 to be elastically deformed such that the external diameter 25 of an end portion of the cylindrical member 24 expands in directions 13, 13' orthogonal to the pressing direction 12, 12'. As shown in FIG. 3C, the expanded external diameter 25 (FIG. 3A) is pressed in contact with the internal wall surface of the hole 970a (FIG. 3C) of the carriage arm 978 and thereby the magnetic head assembly is fixed to the carriage arm 978.

A third embodiment of the present invention will now be explained with reference to FIGS. 4A–4C. In this embodiment, a cylindrical member 34 and a thin plate member 36 of the spring arm 982 are plastically deformed and thereby fixed to the carriage arm 978.

Figure 4A:
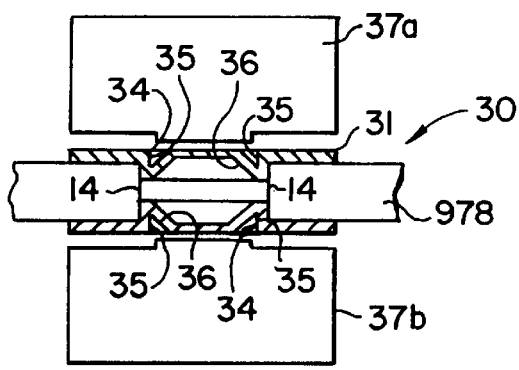
FIG. 4A is a diagram showing the condition of another head spacer before it is fixed to a carriage arm.

The shape of the head spacer 30 shown in FIG. 4A is similar to that of head spacer 11 shown in FIG. 2A. However, these head spacers are distinguishable in that the plate thickness of the cylindrical member 4 and the thin plate member 6 (FIG. 2A) is about 0.035 mm; whereas, the plate thickness of the cylindrical member 34 and the thin plate member 36 of the head spacer 30 (FIG. 4) is about 0.07 mm. Moreover, a distance measured between the external diameter of the cylindrical member 4 and the internal diameter of the hollow hole 970a in FIG. 2 is in the range of about 25 to 30 mm. In contrast, in FIG. 4, the corresponding distance between the external diameter of the cylindrical member 34 and the internal diameter of the hollow hole 970a is in the range of about 1 to 17 mm. Further, the diameter of the cylindrical member 34 is about 2 mm.

Figure 4B:
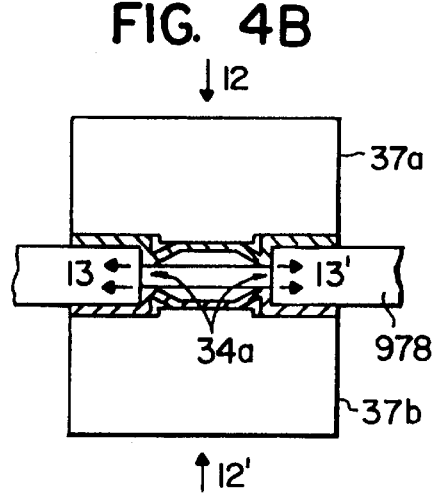
FIG. 4B is a diagram showing a method for fixing the head spacer of FIG. 4A using a pressing jig.
Figure 4C:
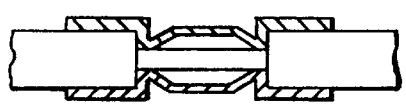
FIG. 4C is a diagram showing the condition of the head spacer of FIG. 4A after it is fixed to a carriage arm.

In FIG. 4B, a spacer plate 31 is held between the carriage arm 978 and pressing jigs 37a, 37b. A pressing force is applied to the thin plate member 36 by moving a pair of pressing jigs 37a, 37b, respectively, in the direction shown by arrows 12, 12'. While the pressing force is being applied, the cylindrical member 34 of the head spacer 30 tries to expand in the directions 13, 13' orthogonal to the pressing direction. However, since the engagement interval between the mounting hole 970a and cylindrical member 34 is sufficiently small, expansion of an end part 34a is restricted and deformation of the end part 34a is impeded. Thus, when the pressing jigs 37a, 37b are moved in the direction shown by arrows 12, 12', the cylindrical member 34 and thin plate member 36 near the end part 34a are plastically deformed because the cylindrical member 34 and thin plate member 36 are thick. As shown in FIG. 4C, fixing of the head spacer to the carriage arm 978 is achieved by pressing the external wall surface 35 of the cylindrical member 34 in contact with the internal wall surface 14 of the hollow hole 970a. Moreover, the shape of the coupling portion between the cylindrical member 34 and thin plate member 36 may be maintained even after the pressing force is no longer applied as a result of the plastic deformation.

A fourth embodiment of the present invention will now be explained with reference to FIGS. 5A–5C. Like the third embodiment, the magnetic head assembly in the fourth embodiment is fixed to the carriage arm by plastic deformation of the coupling area of the cylindrical member and thin plate member.

Figure 5A:
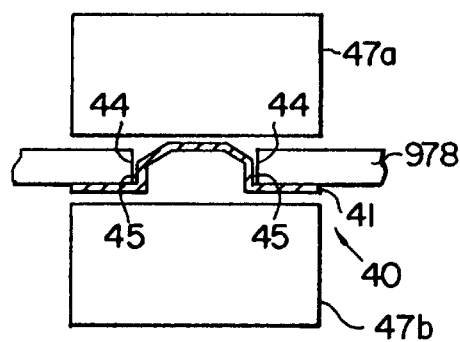
FIG. 5A is a diagram showing the condition of another head spacer before it is fixed to a carriage arm.
Figure 5B:
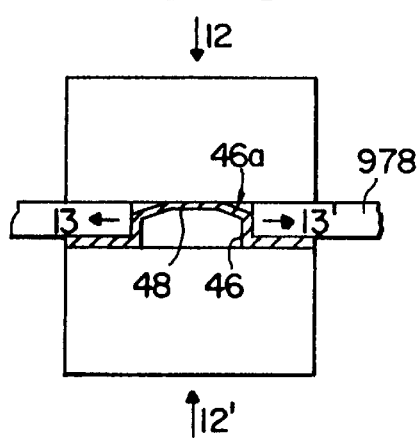
FIG. 5B is a diagram showing a method for fixing the head spacer of FIG. 5A using a pressing jig.
Figure 5C:
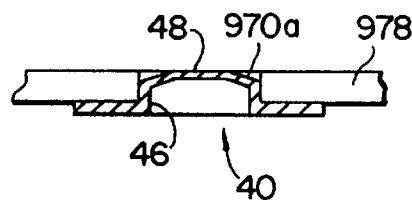
FIG. 5C is a diagram showing the condition of the head spacer of FIG. 5C after it is fixed to a carriage arm.

The shape of the spacer 40 in FIG. 5A is similar to that of head spacer 20 shown in FIG. 3A. However, the respective head spacers of each embodiment are distinguishable in that the plate thickness of the cylindrical member 24 and thin plate member 26 (FIG. 3A) is about 0.06 mm; whereas, the plate thickness of the cylindrical member 44 and the thin plate member 46 of the head spacer shown in FIG. 5 have a plate thickness of about 0.12 mm. Moreover, a distance measured between the external diameter of the cylindrical member 24 and the internal diameter of the hollow hole 970a of the carriage arm 978 in FIG. 3A is in the range of about 25 to 30 mm. In contrast, in FIG. 5A, the corresponding distance between the external circumferential surface 45 of the cylindrical member 44 and the internal diameter of the hollow hole 970a is in the range of about 1 mm to 17 mm.

The fourth embodiment shown in FIG. 5A is formed in a manner similar to that of the third embodiment. In particular, a pair of pressing jigs 47a, 47b are used to press a thin plate member 48 in a direction shown by arrows 12, 12' (FIG. 5B) while the spacer plate 41 of the head spacer 40 is held between the pressing jig 47b and carriage arm 978. In this manner, an end part 46a of the cylindrical member 44 is plastically deformed and an external circumferential surface 45 is closely placed in contact and fixed to the internal wall surface of the carriage arm 978.

A fifth embodiment of the present invention will now be explained with reference to FIGS. 6A and 6B. The fifth embodiment provides a structure which assures easier removal of a head spacer from a carriage arm.

Figure 6A:
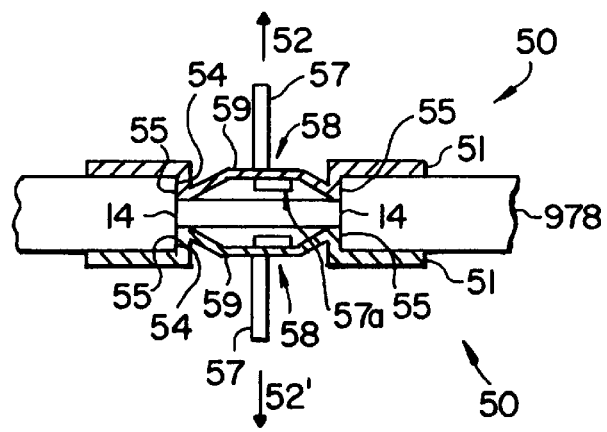
FIG. 6A shows a head spacer fixed to a carriage arm.
Figure 6B:
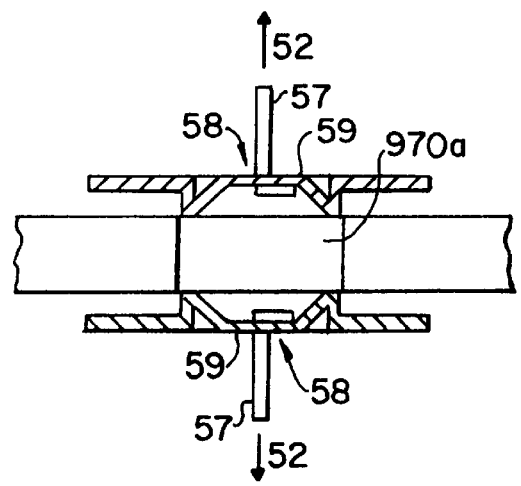
FIG. 6B shows a method for removing a head spacer using a pressing jig.

The spacer plate 51 shown in FIG. 6A is different from the spacer plate 31 shown in FIG. 4 in that a thin plate member 59 is provided with an aperture 58 configured to allow insertion of a hooking portion 57a of an L-shaped lever 57. Further, in the magnetic head assembly of this embodiment, the mounting hole 970a may be either a through hole or a blind hole.

As shown in FIG. 6A, the carriage arm 978 is provided with head spacers 50 at both upper and lower surfaces thereof. Each head spacer 50 is provided with a spacer plate 51 which is fixed to the carriage arm 978 by plastic deformation in the same manner as the head spacer 30 shown in FIGS. 4A–4C. In this manner, the external circumference surface 55 of the cylindrical member 54 is pressed closely in contact with the internal circumference surface 14 of the carriage arm 978.

The head spacer 50, shown attached to the carriage arm 978 in FIG. 6A, may be removed as follows. First, the hooking portion 57a of the L-shaped lever 57 is inserted into the aperture 58. Next, the hooking portion 57a of L-shaped lever 57 is engaged with the thin plate member 59 by inserting the hooking portion 57a in the aperture 58 and revolving it by about 90 degrees. Then, the L-shaped lever 57 is pulled in a direction shown by arrows 52, 52'. Subsequently, as shown in FIG. 6B, the head spacer 50 may be removed from the carriage arm 978.

While the removal method was discussed with reference to a situation in which a head spacer is mounted to a carriage arm via plastic deformation; this method may also be used where the head spacer is mounted using elastic deformation. In this case, the thin plate member 6 (FIG. 2A) is provided with an aperture (not shown) for receiving the hooking portion of hooking portion 57a of the L-shaped lever 57. The head spacer 11 is shifted from the second stabilized shape to the first stabilized shape by a pulling force applied via the L-shaped lever 57 in the direction of arrow mark 63 (refer to FIG. 1C). As the head spacer 11 is returned to the first stabilized shape, the external diameter of the cylindrical member 4 becomes smaller than the internal diameter of the hollow hole 970a of the carriage arm 978. Moreover, as a result of the applied force, the aperture in the thin plate member 6 becomes elongated. Therefore, the head spacer 11 may be easily removed from the carriage arm 978.

A sixth embodiment of the present invention will now be explained with reference to FIG. 7. In this embodiment, the carriage arm is an E-shaped arm which is integrally formed with a plurality of arms by, for example, molding.

Figure 7:
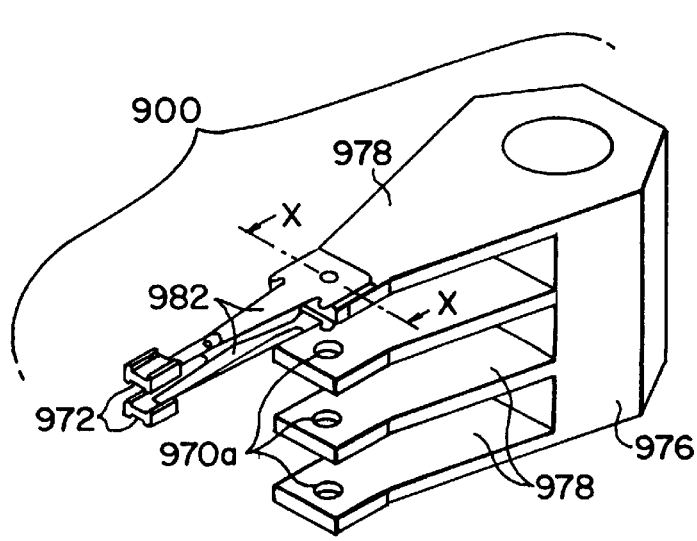
FIG. 7 is a perspective view of a magnetic head arm.

In FIG. 7, the magnetic head actuator 900 is composed of an actuator assembly 976 having a plurality of carriage arms 978, a spring arm 982 provided at the end portion of the carriage arm 978 and a magnetic head 972 provided at the end portion of the spring arm 982. To simplify the drawing, only the uppermost carriage arm 978 in FIG. 7 is shown provided with a spring arm 982 and a magnetic head 972. However, in use, each of the other arms 978 would similarly be provided with a spring arm and at least one magnetic head. Each spring arm 982 is provided with a magnetic head at one end, and a head spacer (not illustrated) at an opposite end. This head spacer is formed in a manner previously explained with reference to FIGS. 1–6, and includes a cylindrical member projected from a spacer plate. The spacer plate is mounted to the carriage arm 978 through engagement of the cylindrical member with the mounting hole 970a provided in the carriage arm 978.

Figure 8A:
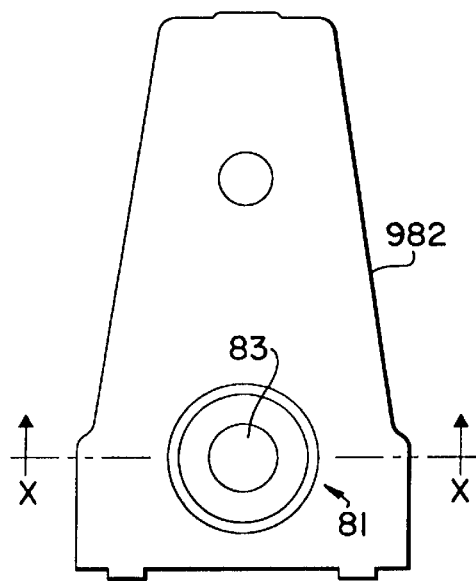
FIG. 8A is a plan view showing a shape of the head spacer.
Figure 8B:
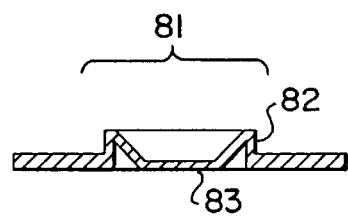
FIG. 8B is a cross-sectional view along the line X—X in FIG. 8A.

A seventh embodiment of the present invention will now be explained with reference to FIGS. 8A–8B, where FIG. 8A is a plan view showing a shape of the spring arm 982, while FIG. 8B is a cross-sectional view along the line X—X of FIG. 8A.

In FIGS. 8A–8B, the head spacer 81 is integrated with the spring arm 982 as a single piece, and the spring arm 982 is mounted to the carriage arm 978 using either of the previously discussed plastic or elastic deformation methods. The head spacer 81 is provided with a hollow cylindrical projected portion 82 which protrudes from the surface of the spring arm 982. The projected portion 82 has a thin plate type circular deforming surface 83 at the center thereof. The deforming surface 83 is formed in a central recessed portion of the head spacer 81.

Figure 9A:
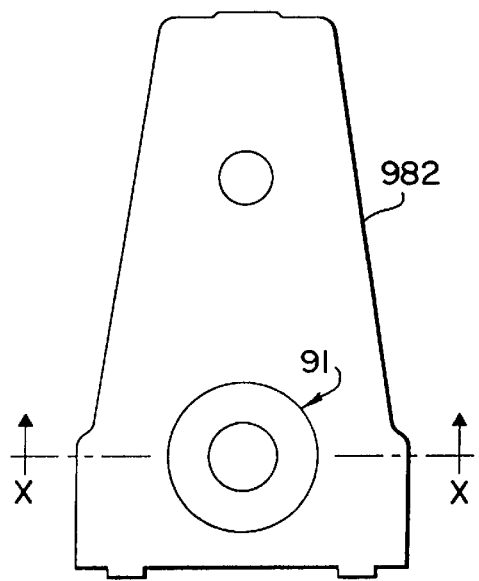
FIG. 9A is a plan view showing a shape of the head spacer.
Figure 9B:
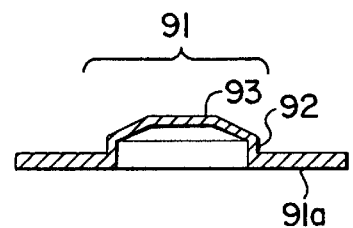
FIG. 9B is a cross-sectional view along the line X—X in FIG. 9A.

An eighth embodiment of the present invention will now be explained with reference to FIGS. 9A–9B, in which FIG. 9A is a plan view showing an alternate shape of the spring arm 982, while FIG. 9B is a cross-sectional view along the line X—X in FIG. 9A.

As shown, a head spacer 91 is integrated with the spring arm 982 as a single piece, and the spring arm 982 may be mounted to the carriage arm 978 using either of the plastic or elastic deformation methods previously discussed. The head spacer 91 is provided with a projected portion 92 which extends upward from the surface of the spring arm 982. The projected portion 92 is provided at a center portion with a circular thin plate type deforming surface 93. This deforming surface 93 protrudes from an end part, in a direction away from the surface of a flange 91a.

The ninth to eighteenth embodiments of the present invention will now be explained with reference to FIGS. 10A–19B.

The ninth to eighteenth embodiments illustrate various modifications of the projected portion of the spring arm. In each of these embodiments, the spring arm and the spacer plate including the projected portion are integrally formed as a single piece. However, the depicted modifications of the projected portion may also be applied in situations where the spring arm and spacer plate are separately formed as individual elements which are then integrated. In each of these embodiments, the spring arm may be fixed to the carriage arm using the plastic or elastic deformation methods previously discussed. In each of FIGS. 10–19, the "A" view, e.g., FIGS. 10A, 11A, . . . , 19A, is a plan view showing the alternate shapes of the spring arm. Further, the corresponding "B" view of each figure, e.g. FIGS. 10B, 11B, . . . , 19B, is a cross-sectional view along the line X—X of the "A" view of the spring arm.

The ninth embodiment of the present invention is illustrated in FIGS. 10A–10B. In this embodiment, the spring arm 978 is provided with a head spacer 101 having a projected portion 102. The projected portion 102 has a spherical deforming surface 103 which is depressed toward the surface of a flange 101a.

The tenth embodiment of the present invention is illustrated in FIGS. 11A–11B. In this embodiment, the head spacer 111 is provided with a hollow cylindrical projected portion 112 (FIG. 11B) which extends upward from the surface of the spring arm 982. The projected portion 112 has a circular thin plate type deforming surface 113 provided at a center portion thereof. The thin plate type deforming surface 113 is formed at a position depressed toward a flange 111a from an end part of the projected portion 112. Moreover, the projected portion 112 has an annular projected surface 114 at an external circumferential surface of the end part. In particular, the structure of the projected portion 112 is configured such that only the projected surface 114 is in contact with the internal wall surface of the mounting hole 970a. The limited contact surface of the annular projected surface 114 concentrates the force pressing against the internal wall surface of the mounting hole 970a of the carriage arm resulting in an intensified fixing force.

The eleventh embodiment of the present invention is illustrated in FIGS. 12A–12B. In this embodiment, the spring arm 982 is provided with a head spacer 121 having a projected portion 122. In turn, the projected portion 122 has a circular deforming surface 123 at a center portion thereof. Moreover, the projected portion 122 is provided at an edge 124 with eight wedge-type cuttings 125 which facilitate deformation of the edge 124.

The twelfth embodiment of the present invention is illustrated in FIGS. 13A–13B. In this embodiment, the spring arm 982 is provided with a head spacer 131 having a projected portion 132. The projected portion 132 has a circular deforming surface 133 at a center portion thereof. This circular deforming surface 133 is formed at a position depressed toward a flange 131a from an upper end part of the projected portion. Further, a lower end part of the circular deforming surface 133 is entirely opened, and defines an aperture 134.

The thirteenth embodiment of the present invention is illustrated in FIGS. 14A–14B. In this embodiment, the spring arm 982 is provided with a head spacer 141 having a projected portion 142. In turn, the projected portion 142 has a circular deforming surface 143 at a center portion which extends away from the surface of a flange 141a of the head spacer 141. Further, an upper end part of the circular deforming surface 143 is entirely opened to form an aperture 144.

In the eleventh to thirteenth embodiments shown in FIGS. 12 to 14, the structure of the head spacer is configured such that less force is required to deform the head spacer.

The fourteenth embodiment of the present invention is illustrated in FIGS. 15A–15B. In this embodiment, the spring arm 982 is provided with a head spacer 151 having a projected portion 152. In turn, the projected portion 152 has a spherical deforming surface 153 which extends away from the surface of a flange 151a.

Figure 16A:
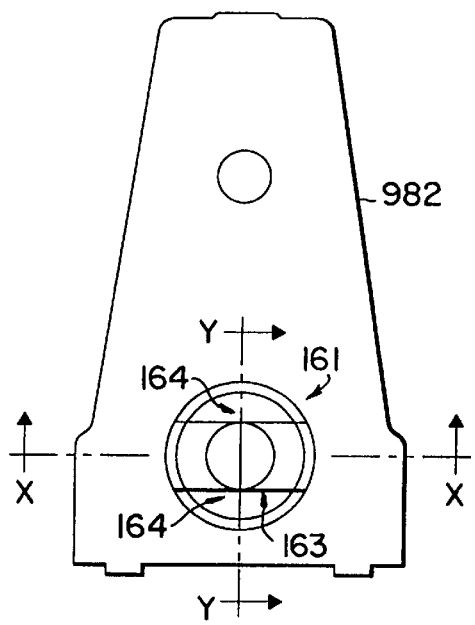
FIG. 16A is a plan view showing a shape of the head spacer.
Figure 16B:
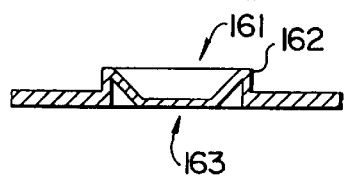
FIG. 16B is a cross-sectional view along the line X—X in FIG. 16A.
Figure 16C:
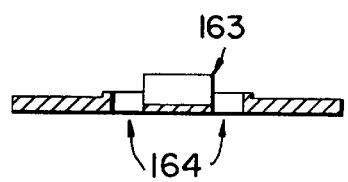
FIG. 16C is a cross-sectional view along the line Y—Y in FIG. 16A.

The fifteenth embodiment of the present invention is illustrated in FIGS. 16A–16C, where FIG. 16(c) is a cross-sectional view along the line Y—Y of FIG. 16A. In this embodiment, the spring arm 982 is provided with a head spacer 161 having a projected portion 162. In turn, the projected portion 162 is provided at a center portion with a circular deforming surface 163. Moreover, the projected portion 162 of the head spacer 161 has a circular groove or recess 164 surrounding the circular deforming surface 163. This structure enables a reduction in the force required to deform the head spacer 161. Additionally, the recess 164 allows insertion of the hooking portion 57a of the L-shaped lever 57. Therefore, like the embodiment of FIG. 6, the head spacer 161 may be removed easily from the carriage arm 978, improving the maintainability of the actuator assembly.

Figure 17A:
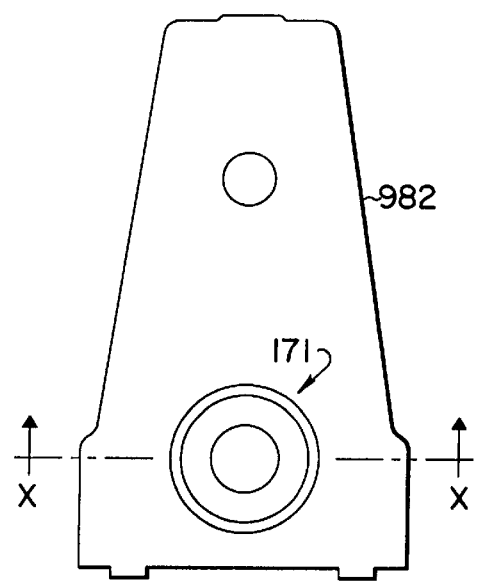
FIG. 17A is a plan view showing a shape of the head spacer.
Figure 17B:
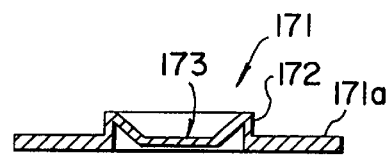
FIG. 17B is a cross-sectional view along the line X—X in FIG. 17A.

The sixteenth embodiment of the present invention is illustrated in FIGS. 17A–17B. In this embodiment, the spring arm 982 is provided with a head spacer 171 having a projected portion 172. In turn, the projected portion 172 has a thin plate type deforming surface 173 provided at a position recessed toward a surface of a flange 171a of the head spacer 171 from an upper end side of the projected portion 172. The deforming surface 173 does not extend up to the surface of the flange 171a and is formed at the intermediate position in a height direction of the projected portion 172.

The seventeenth embodiment of the present invention is illustrated in FIGS. 17A–17B. In this embodiment, the spring arm 982 is provided with a head spacer 181 having a projected portion 182. In turn, the projected portion 182 has a thin plate type deforming surface 183 provided at a position recessed toward a surface of a flange 181a of the head spacer 181 from an upper end side of the projected portion 182. The deforming surface 183 is provided at a position recessed below the surface of the flange 181a.

As shown in FIGS. 17 and 18, the difference between the external diameters of the projected portions 172, 182 before and after the deformation may be reduced by, for example, using a spring arm such as the one shown in FIG. 17A. Correspondingly, the difference between the external diameters of the projected portion 172, 182 before and after the deformation may be increased by, for example, using a spring arm of the shape shown in FIG. 18A.

The eighteenth embodiment of the present invention is illustrated in FIGS. 19A–19B. In this embodiment, the spring arm 982 is provided with a head spacer 201 having a projected portion 202. In turn, the projected portion 202 has a circular deforming surface 203 at a center portion thereof. This deforming surface 203 is located at a position depressed toward a surface of a flange 201a of the head spacer 201 from an upper end of the projected portion 202. The deforming surface 203 of the head spacer 201 is provided with an elongated hole 208 which facilitates insertion of the hooking portion 57a of the L-shaped lever 57 (not shown).

Removal of the head spacer 201 from the carriage arm 978 according to this embodiment, may be performed in the same manner as the embodiment shown in FIG. 6. Moreover, in this embodiment, the hole 208 is provided on the deforming surface 203 (FIG. 19B) to receive the hooking portion 57a; however, the present invention is not limited thereto. For example, it is also possible to form the deforming surface 203 as a thin plate member without the hole 208.

Figure 20A:
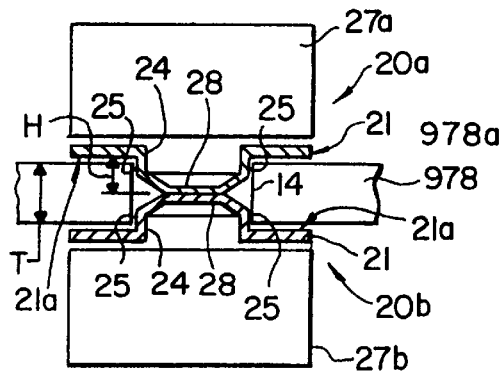
FIG. 20A shows a head spacer fixing sequence.
Figure 20B:
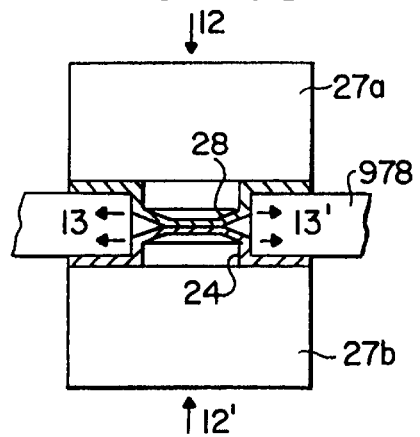
FIG. 20B shows a method for fixing a head spacer using a pressing jig.
Figure 20C:
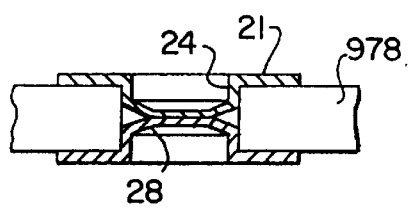
FIG. 20C shows the condition of a head spacer after it is fixed to a carriage arm.

The nineteenth embodiment of the present invention is illustrated in FIGS. 20A–20C.

Like several of the previously described embodiments, the nineteenth embodiment also utilizes a plastic deformation process to attach the spring arm to a carriage arm.

In FIG. 20A, a pair of head spacers 20a, 20b is mounted to an end of the spring arm 982 opposite the magnetic head 972 by, for example, spot welding. The head spacer 20a is provided with a spacer plate 21 including a cylindrical member 24 which is integrated therewith as a single piece and a thin plate member 28. The thin plate member 28 extends between a flange 21a and an end part of the cylindrical member 24. The thickness of the cylindrical member 24 and thin plate member 28 is about 0.12 mm. In particular, the cylindrical member 24 is formed as a hollow cylindrical body and has a thickness of about 0.12 mm. Moreover, the thin plate member 28 is a hollow conic body having a trapezoidal shaped cross-section, and also has a thickness of about 0.12 mm. The external diameter of the cylindrical member 24 is about 2 mm and the size difference between the external diameter of the cylindrical member 24 and the internal diameter of the hole 970a in the carriage arm 978 ranges from about 1 mm to 17 mm.

The head spacer 20a is configured such that a distance H between an upper end surface of the flange 21a and an upper end face of the thin plate member 28 is longer than half of a length of T of the carriage arm 978. During assembly, the head spacer 20a is inserted into the hole 970a of the carriage arm 978 from the upper surface side of the carriage arm. Correspondingly, the head spacer 20b is inserted into the hole 970a of the carriage arm 978 from the lower surface side of the carriage arm 978. Moreover, the head spacers 20a and 20b are inserted such that an end face of the thin plate member 28 of each of the head spacers 20a and 20b is in contact with one another. As shown in FIG. 20A, a clearance is formed between the upper end surface of the flange 21a of the head spacer 20a and the surface 978a of the carriage arm 978.

Coupling of the head spacer to the carriage arm is accomplished via plastic deformation. In particular, a pressing force is imparted to the head spacer 20a, 20b by moving a pair of pressing jigs 27a, 27b in a direction shown by arrows 12, 12'. The pressing force causes the coupling portion of the cylindrical member 24 and thin plate member 28 to expand along a direction shown by arrows 13, 13' orthogonal to the pressing directions 12, 12'. Additionally, as shown in FIG. 20C, the pressing force pushes an external wall surface 25 of the cylindrical member 24 against the internal wall surface 14 of the hole 970a.

A twentieth embodiment of the present invention will now be explained with reference to FIGS. 21A–21B.

Figure 21A:
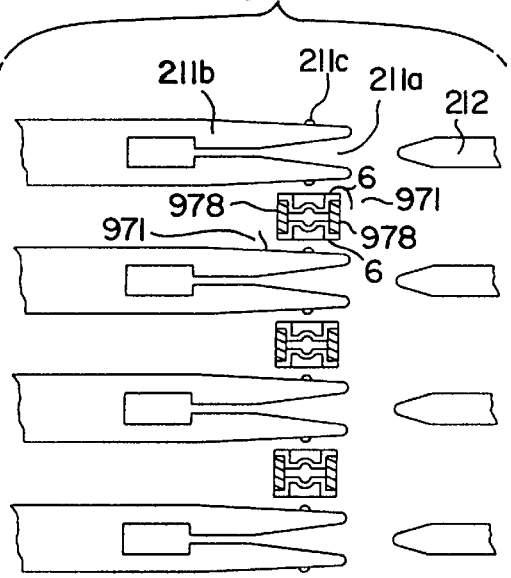
FIG. 21A is a diagram illustrating a method of simultaneously fixing a plurality of a head spacers and carriage arm, and shows the condition before the fixing.
Figure 21B:
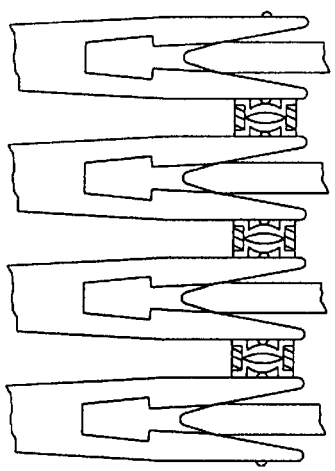
FIG. 21B shows a method for fixing a head spacer using a pressing jig.

In FIG. 21A, three carriage arms 978 are respectively provided with a magnetic head assembly 971 at each of upper and lower surfaces. First, the mounting portion 970 (projected portion 989b) of the magnetic head assembly 971 is engaged with the mounting hole 970a formed at the end part of the carriage arm 978. Next, the carriage arm 978 is arranged in a V-shaped slit 211a cooperatively defined between a pair of members 211b. In particular, the carriage arm 978 is arranged at a position where a projected portion 211c is engaged with the thin plate member 6 (refer to FIG. 21B).

To this end, the V-shaped slit 211a is widened by pushing a member 212 into the slit 211a (refer to FIG. 21A). Further, the degree to which the slit 211a is widened depends on the insertion amount of the member 212. Subsequently, after the magnetic head assembly 971 is pushed to the carriage arm 978, the member 212 is withdrawn and the magnetic head assembly 971 is fixed in place.

According to this method, when the engaging portion of the magnetic head assembly 971 and carriage arm 978 is fixed, it is only required to vertically press the magnetic head assembly to the carriage arm 978 and thereby high quality magnetic head arm can be manufactured with good manufacturing yield.

Figure 27:
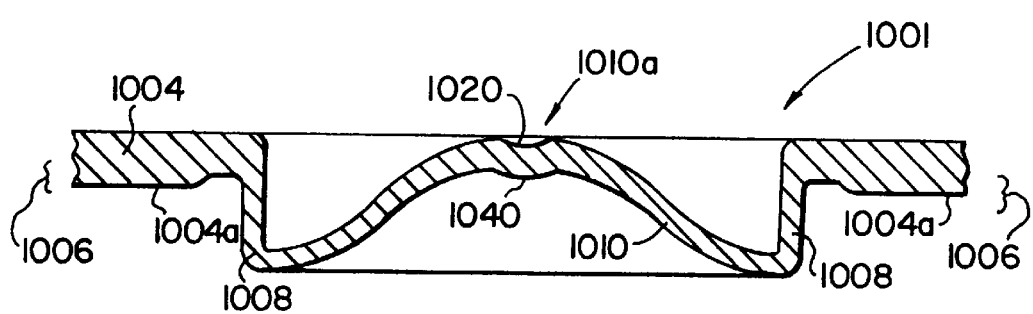
FIG. 27 is a cross-sectional view of the head spacer which enables simultaneous fixing of a plurality of heads.

A twenty first embodiment of the present invention will now be explained with reference to FIG. 27. In this embodiment, a head spacer 1001 is provided with a flange 1004 having a plate thickness of 0.196 mm and a flange surface 1004a having a plurality of ribs 1006 extended along a radial direction and having a height of about 0.04 mm. The head spacer 1001 is formed by squeezing a hollow cylindrical member 1008 having a thickness of about 0.07 mm. Moreover, the external diameter of the cylindrical member 1008 is about 1.996 mm.

The head spacer 1001 is provided with a conic thin plate member 1010 extending from one end of the cylindrical member 1008 to the other. In turn, conic thin plate member 1010 is provided with a top area 1010a with a recessed portion 1020 and a projected portion 1040. Notably, the force required to plastically deform the coupling portion of the cylindrical member 1008 and the thin plate member 1010 is reduced as a result of the recessed area 1010a of the thin plate member 1010.

While the principles of various aspects of the present invention have been described above in connection with specific embodiments, it is to be understood that this description is made only by way of example and not as a limitation on the scope of the invention.

What is claimed is:

1. A magnetic head assembly including a carriage arm having a mounting hole, and a spring arm having a hollow projected portion having an engaging portion, wherein:

said engaging portion has a thin plate projected toward a center area from an internal side of a wall surface of said projected portion; and said external diameter of said engaging portion is reversibly changed through a plastic deformation process between a first diameter and a second diameter by changing an angle formed by said projected thin plate and the wall surface of said projected portion;

wherein said engaging portion is configured for removable attachment to the carriage arm solely though a process of plastic deformation and without the use of a caulk ball or other member to maintain a pressing force of said engaging portion.

2. A magnetic head assembly comprising:

a spring arm having at least one magnetic head at one end thereof, and a mounting portion at an opposite end thereof;

said mounting portion including a cylindrical member and a thin plate member provided at one end of said cylindrical member, wherein said mounting portion is configured for removable attachment to a mounting hole of a carriage arm of said magnetic head assembly solely though a process of plastic deformation and without the use of a caulk ball or other member to maintain a pressing force of said mounting portion;

said cylindrical member and said thin plate member being configured to be reversible deformed by plastic deformation between a first stabilized shape where said cylindrical member has a first external diameter and said thin plate member has a first trapezoidal shape, and a second stabilized shape where said cylindrical member has a second external diameter larger than said first external diameter and said thin plate member has a second shape inverse of said first trapezoidal shape.

3. A magnetic disk drive according to claim 1, wherein said thin plate member has a hooking portion.

4. A magnetic disk drive, comprising:

a carriage arm defining a mounting hole;

a spring arm having a cylindrical mounting portion at a first end and a magnetic head mounted on a second end;

said cylindrical mounting portion including a cylindrical member configured for plastic deformation, said cylindrical member being configured for removable engagement with an inner surface of said carriage arm within said mounting hole;

a thin plate member configured for plastic deformation, provided at one end of said cylindrical member, said thin plate member having a trapezoidal cross-section; and said cylindrical member extending away from a planar surface of said thin plate member, whereby said spring arm is removably attached to said carriage arm in an attachment state solely through plastic deformation of said cylindrical member which creates a pressing force pressing said cylindrical member against said inner surface of said carriage arm within said mounting hole without the use of a caulking ball or other member to maintain said pressing force said cylindrical member and said thin plate member have a first stabilized shape where the external diameter of said cylindrical member facilitates easy insertion of said cylindrical member within said mounting hole, said cylindrical member and said thin plate member have a second stabilized shape where the external diameter of said cylindrical member is enlarged through a process of plastic deformation such that said cylindrical member and said thin plate member are urged against an internal diameter of the mounting hole, and said cylindrical member and said thin plate member are elastically deformed to said second stabilized shape from said first stabilized shape.

5. A magnetic disk drive according to claim 4, wherein said thin plate member has a hooking portion.

6. A method of fabricating a magnetic head arm including a magnetic head assembly and a carriage arm, said method comprising:

a first step of inserting, into a mounting hole defined in the carriage arm, an engaging portion of the magnetic head arm, said engaging portion including a hollow cylindrical member and a thin plate member of trapezoidal shaped cross-section provided at a first end of said cylindrical member; and a second step of changing the trapezoidal shaped cross-section of said thin plate member into an inverse shape through a process of plastic deformation by pressing said thin plate member thereby causing the cylindrical member to expand within said mounting hole so that said cylindrical member is pressed closely in contact with said mounting hole of said carriage arm, wherein said magnetic head arm is removably attached to said carriage arm.

7. A head spacer for removably attaching a spring arm to a carriage arm without the use of a caulking ball, said head spacer comprising:

a hollow cylindrical member having first and second ends;

a conic thin plate member extending from said first end of said cylindrical member to said second end of said cylindrical member, said conic thin plate member including a top area having a recessed portion at an outer surface and a projected portion at an inner surface;

said conic thin plate member being configured for reversible plastic deformation between a first stabilized shape and a second stabilized shape inverse of said first stabilized shape; and a flange integrally formed with said hollow cylindrical member, said flange having a plurality of ribs extended along a radial direction;

whereby said recessed portion of said thin plate member is configured to reduce a force required to plastically deform said cylindrical member and said thin plate member, and said spring arm is removably attached to said carriage arm by plastically deforming said cylindrical member and said thin plate member.

* * * * *